Nov. 9, 1926.　　　　　　　　　　　　　　　　1,605,968
L. A. MILLER
STORAGE BATTERY PLATE AND THE MANUFACTURE THEREOF
Filed July 17, 1923
Fig. 1.　　　　　　　　　　　Fig. 2
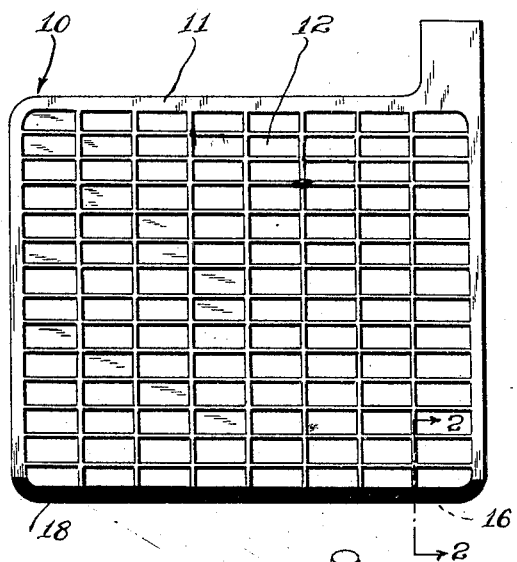
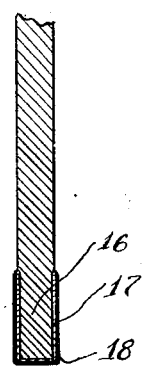
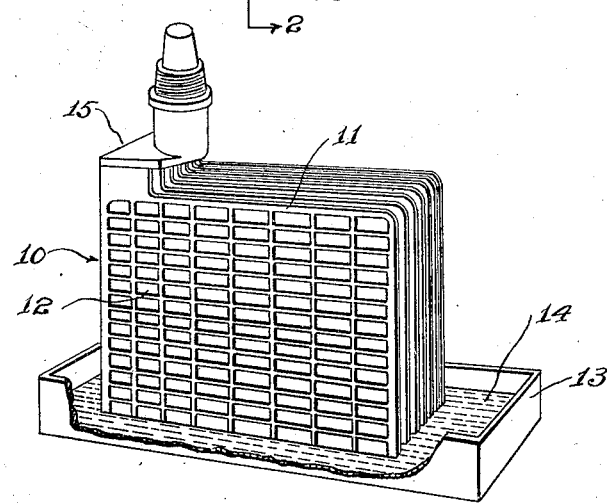
Fig. 3.
Inventor
Louis A. Miller
By J. Richard Paris.
Attorney Patented Nov. 9, 1926.

1,605,968

UNITED STATES PATENT OFFICE.

LOUIS A. MILLER, OF WASHINGTON, DISTRICT OF COLUMBIA.

STORAGE-BATTERY PLATE AND THE MANUFACTURE THEREOF.

Application filed July 17, 1923. Serial No. 652,090.

It is the object of this invention to minimize the short circuits that occur within the cells of the battery. Practically all the short circuits that occur within the cell take place across the bottoms or lower edges of the grids or plates. The causes of such short circuiting are numerous. Frequently the accumulated deposit or sediment on the bottom of the jar reaches to the level of the plates, and short circuits them. A phenomenon, known in the art as "treeing," when active material builds perpendicularly to the surface of the plate, is frequently responsible for short circuits in cases of floating separators or of cracked separators. Separators are sometimes cracked by buckling plates. The active material then "trees" through the crack and short circuits the plates.

In order to eliminate the above and a good many other causes of short circuiting it is the object of this invention to produce an electrode plate which is covered by an acid resisting insulating material along its lower edge. The insulating material should preferably have a melting point below the melting point of the metal of which the grid is made. I find that asphaltum insulating compound or sealing compound used for sealing and covering the cells of the battery gives the best results.

Another object of the invention is to provide a method of applying the insulating material which will not necessitate any modification of the construction or method of manufacture of the plate.

While good results may be obtained by applying the molten insulating material by a brush or in a similar manner, I prefer to apply it by the process described hereinafter, I melt the insulating material such as sealing compound or asphaltum in a shallow pan, I raise the temperature of the insulating material to approximately the melting point of the material of the grid. Then I partly immerse a group of plates in the bath taking care that none of the active material on the plate is immersed in the insulating material.

Fig. 1 shows a face view of the plate. Fig. 2 is a section on line 2—2 of Fig. 1. Fig. 3 illustrates the method used.

In Fig. 1 reference numeral 10 shows the plate which comprises the frame 11 enclosing the active material 12. In Fig. 3, 13 is the shallow pan having the molten insulating material 14 therein. A group of plates 15 are shown partly immersed in the insulating material 14. Good results may be obtained by merely dipping the lowermost portion of the plates in the molten insulating material. I prefer, however, to raise the temperature of the insulating material to approximately the melting point of the metal. The molten insulating material in the pan reaches a depth substantially the same as the lower cross member 16 of the grid. By giving the plates a rocking motion the insulating material will cover the vertical members of the frame to a slightly higher level, but care must be taken not to cover any of the active material 12. The plates are allowed to remain in this position for a predetermined period of time, which is no more than a few seconds. The dimensions of the plate and the specific heat capacity of the metal is such that its immersed portion quickly approaches its melting point. The outer layer of the immersed portion of the plate softens, and an intermediate thin layer 17 is formed in which the metal and the insulating compound are intermingled. This intermediate layer 17 serves as a binder between the outer layer of insulating material such as sealing compound or asphaltum 18 and the metal 16. The layers 17 and 18 are thin and do not add materially to the thickness of the plate.

Some insulating compounds, such as certain grades of asphaltum insulating compound or sealing compound used in the storage battery industry have low melting points and when heated to much higher temperatures, they smoke and deteriorate. With such insulating compounds I modify the process described hereinbefore somewhat. I provide two pans each containing the insulating compound, such as asphaltum, sealing compound or the like. The material in one of the pans is kept at a temperature in the vicinity of its melting point while the material in the other pan is kept at approximately the melting point of the metal of the plate. The electrolytically inactive portion of the plate which it is desired to insulate is first dipped in the hotter compound.

It is held there only long enough to obtain that very thin intermingled layer of metal and insulating compound and also a very thin outer layer of insulating compound. The plate is then removed from this material and, without permitting it to cool, the same portion immediately dipped in the cooler compound. This gives us two successive layers, one of which is the layer 17 shown and the other is the outer layer 18 which consists of insulating compound of good quality, and whose qualities have not been altered by excessive heating.

The methods described hereinabove do not modify the construction or the manufacture of the plates. The processes are designed to be applied to the plates after the plates have been completed and just prior to the assembly of the plates to form the storage cell. The layer or layers of insulating material described hereinabove may be applied to each individual plate separately or to a group of plates in the manner shown and described. The layer obtained by this process is acid resisting, impervious to the electrolyte, will serve to prevent short circuits inside the battery and will lengthen the life of the battery.

Having described my invention, I claim:

1. A storage battery electrode plate having a layer of acid resisting insulating material of a melting point lower than the melting point of the metal of the plate covering the lower horizontal portion of the frame.

2. A storage battery electrode plate of the grid type having an insulating layer of asphaltum covering the lower horizontal cross member of the frame.

3. A storage battery electrode plate having a layer of insulating material of a melting point lower than the melting point of the metal of the plate covering an electrolytically inactive part of the frame and an interlayer of metal intermingled with the insulating material disposed between the layer of insulating material and the face of the metal.

4. The method of insulating an electrolytically inactive portion of an electrode plate of a storage battery comprising the steps of melting an insulating material, raising the temperature of the material to approximately the melting point of the metal of the plate, and dipping the inactive portion of the plate in the molten mass.

5. The method of insulating an electrolytically inactive portion of an electrode plate of a storage battery comprising the steps of melting an insulating material and dipping the inactive portion in the molten material.

6. The method of insulating an electrolytically inactive portion of an electrode plate comprising the steps of melting asphaltum and dipping the inactive portion in the molten asphaltum.

7. The method of insulating an electrolytically inactive portion of an electrode plate of a storage battery comprising the steps of heating an asphaltum insulating compound to the melting point of the metal of the plate, dipping the inactive portion in the asphaltum, and dipping the said portion in asphaltum insulating compound heated to its melting point.

In testimony whereof I hereunto affix my signature.

LOUIS A. MILLER.